Patented Sept. 2, 1924.

1,507,105

UNITED STATES PATENT OFFICE.

HANNS CARSTENS, OF LEVERKUSEN, NEAR COLOGNE, ALFRED ENGELHARDT, OF WIESDORF, NEAR COLOGNE, AND WOLF JOHANNES MÜLLER, OF LEVERKUSEN, NEAR COLOGNE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

PROCESS OF OXIDIZING HYDROGEN SULPHIDE.

No Drawing. Application filed October 20, 1923. Serial No. 669,806.

*To all whom it may concern:*

Be it known that we, HANNS CARSTENS, ALFRED ENGELHARDT, and WOLF JOHANNES MÜLLER, citizens of Germany, residing at Leverkusen, near Cologne-on-the-Rhine, Wiesdorf, near Cologne-on-the-Rhine, and Leverkusen, near Cologne-on-the-Rhine, in the State of Prussia, Germany, have invented new and useful Improvements in Processes of Oxidizing Hydrogen Sulphide, of which the following is a specification.

When obtaining sulfur from the many gases containing hydrogen sulphide which occur in technical practice certain difficulties are met with inasmuch as the oxidation of the hydrogen sulphide to sulfur according to the equation $2H_2S+O_2=2H_2O+2S$ does not proceed to completion.

Gases having a high content in hydrogen sulphide are commonly burnt in a Claus furnace over bauxite or ferric oxide at a dull red heat but the issuing gases generally still contain small quantities of hydrogen sulphide.

While by a process described and claimed in Patent No. 1,479,852, granted January 8, 1924, to Alfred Engelhardt, decomposition may be rendered complete by the use of porous charcoal as a carrier (catalyst), yet the use of such carbon has the defect that with an excess of oxygen the carbon may burn; moreover the hydrogen sulphide content of the industrial gases containing the same frequently varies and it will accordingly be necessary to keep the added oxygen in true relation as indicated in the above equation.

According to this invention sulfur is obtained from a gas containing hydrogen sulphide by causing it while admixed with air to react upon porous silicic acid (activated silica gel), such as, for example, the highly porous silicic acid which can be obtained by dehydrating hydrated silicic acid, as described, for instance, in the application of Müller and Carstens, filed July 10, 1923, Ser. No. 650,730.

In contradistinction to the catalysts of the Claus process, silicic acid effects a smooth oxidation of hydrogen sulphide to sulfur so that the issuing gases from the process are free from hydrogen sulphide.

An important advantage is that silicic acid is not oxidizable as is the case with carbon and thus is not destroyed if the gases under treatment contain an excess of oxygen.

Silicic acid is applicable with advantage not only in precipitating sulfur from gases rich in hydrogen sulphide when the reaction is effected at a high temperature and the sulfur is obtained directly in the form of drops of liquid but also from gases very poor in hydrogen sulphide such as obtained in a gas derived from the gasification or distillation of fuel. Usually such gases are purified from hydrogen sulphide by the aid of ferric oxid or residues derived from the working up of bauxite, on which the sulfur produced by oxidizing the hydrogen sulphide is precipitated. From this mass the sulfur is obtained by extraction, but the residues cannot be again utilized for a renewed separation of sulfur.

If, however, gas mixed with the quantity of air necessary for the oxidation of its contents of hydrogen sulphide is passed through highly porous silicic acid, the spent silicic acid will after the extraction of the sulfur therefrom retain its original qualities and can therefore again be employed for the purification of gas. Any suitable solvent of sulfur may be employed for this purpose, for example, carbon disulphide, mono- or di-chlorbenzene, tetrahydronaphthaline, or a solution of an alkali sulphide etc. When an organic solvent is employed the silicic acid is freed therefrom after the extraction by evaporation.

When treating a gas very poor in hydrogen sulphide as above described it is advantageous to operate in the presence of a small quantity of a base such as ammonia or an amine whose presence has the effect of hastening the reaction.

By a modification of the invention the oxygen may be replaced wholly or in part by sulfur dioxide, the highly porous silicic acid effecting a smooth reaction in accordance with the equation $2H_2S+SO_2=2H_2O+3S$, the gases given off being free from all sulfur compounds. This modified process is applicable even when the gases to be treated are very poor in hydrogen sulphide. The temperature of the reaction rises in accordance with the sulfur compound content of the gases to be treated, so that the precipitation of the sulfur takes place within or beyond the mass of the silicic acid. If in the former case the silicic acid becomes finally so saturated with sulfur that reaction no longer takes place, it is regenerated in the manner above described.

Example 1.

A mixture of 20 volumes of hydrogen sulphide and 50 volumes of air are passed through a layer 10 cm. high of highly porous silicic acid which rests upon a base permeable to the gas. The oxidation of the hydrogen sulphide to sulfur proceeds with considerable evolution of heat so that the sulfur is obtained as a liquid from the reaction apparatus. The steam produced in the oxidation is carried off by the residual gases from the process (nitrogen).

Example 2.

Generator gas having a content of about 3 grams of sulfuretted hydrogen in 1 cbm. is mixed with 1 per cent by volume of air (reckoned on the whole gas mixture) and after admixing 0.01 gram of ammonia per cbm. is passed through a layer of highly porous silicic acid. When the mass of the silicic acid has become saturated with sulfur, hydrogen sulphide will appear in the issuing gas. The gas to be treated is then switched on to another silicic acid layer and the sulfur from the first layer is recovered by extracting with hot chlorobenzene from which the sulfur is precipitated on cooling in the form of crystals. It is filtered and freed from the adhering chlorobenzene by steaming and dried. The extracted silicic acid is likewise freed from any chlorobenzene by steaming and can then again be used as a gas purifying material.

Example 3.

A mixture of 5 per cent by volume of sulfur dioxide and 10 per cent by volume of hydrogen sulphide with 85 per cent by volume of nitrogen (as obtained by roasting sulfur ores in the presence of moist air) is passed through a layer of highly porous silicic acid, such as is described in the application of Müller and Carstens hereinbefore mentioned. A small evolution of heat takes place and the sulfur becomes precipitated within the silicic acid. When saturated with sulfur the silicic acid is subjected to a regenerating process such, for instance, as is described in example 2. The silicic acid thus freed from sulfur is then again used for the precipitation of sulfur.

We claim:—

1. Process of oxidizing hydrogen sulphide which comprises contacting gas containing hydrogen sulphide and oxygen with porous silicic acid.

2. Process of oxidizing hydrogen sulphide which comprises contacting gas containing hydrogen sulphide and oxygen with an activated silica gel.

3. Process of oxidizing hydrogen sulphide which comprises contacting gas containing hydrogen sulphide and sulfur dioxide with porous silicic acid.

4. Process of oxidizing hydrogen sulphide which comprises contacting gas containing hydrogen sulphide and sulfur dioxide with an activated silica gel.

5. Process of oxidizing hydrogen sulphide which comprises contacting gas containing hydrogen sulphide and oxidizing gas with porous silicic acid.

6. Process of oxidizing hydrogen sulphide which comprises contacting gas containing hydrogen sulphide and an oxidizing gas with an activated silica gel.

7. Process of oxidizing hydrogen sulphide which comprises contacting gas containing hydrogen sulphide, oxygen and an amine with porous silicic acid.

8. Process of oxidizing hydrogen sulphide which comprises contacting gas containing hydrogen sulphide, oxygen and an amine with an activated silica gel.

9. Process of oxidizing hydrogen sulphide which comprises contacting gas containing hydrogen sulphide, sulfur dioxide and an amine with porous silicic acid.

10. Process of oxidizing hydrogen sulphide which comprises contacting gas containing hydrogen sulphide, sulfur dioxide and an amine with an activated silica gel.

11. Process of oxidizing hydrogen sulphide which comprises contacting a gas containing hydrogen sulphide mixed with air and a basic nitrogen compound with porous silicic acid.

12. Process of oxidizing hydrogen sulphide which comprises contacting a gas containing hydrogen sulphide mixed with air and a basic nitrogen compound with an activated silica gel.

13. Process of oxidizing hydrogen sulphide which comprises contacting a gas containing hydrogen sulphide mixed with sulfur dioxide and a basic nitrogen compound with porous silicic acid.

14. Process of oxidizing hydrogen sulphide which comprises contacting a gas containing hydrogen sulphide mixed with sulfur dioxide and a basic nitrogen compound with an activated silica gel.

15. Process of oxidizing hydrogen sulphide which comprises contacting a gas containing hydrogen sulphide mixed with air and ammonia with porous silicic acid.

16. Process of oxidizing hydrogen sulphide which comprises contacting a gas containing hydrogen sulphide mixed with air and ammonia with an activated silica gel.

17. Process of oxidizing hydrogen sulphide which comprises contacting a gas containing hydrogen sulphide mixed with sulfur dioxide and ammonia with porous silicic acid.

18. Process of oxidizing hydrogen sulphide which comprises contacting a gas containing hydrogen sulphide mixed with sulfur dioxide and ammonia with an activated silica gel.

In testimony whereof we have hereunto set our hands.

HANNS CARSTENS.
ALFRED ENGELHARDT.
WOLF JOHANNES MÜLLER.